(12) United States Patent
Tsukioka et al.

(10) Patent No.: US 12,397,341 B2
(45) Date of Patent: Aug. 26, 2025

(54) RIVETING DEVICE AND RIVETING METHOD

(71) Applicant: MITSUBISHI HEAVY INDUSTRIES, LTD., Tokyo (JP)

(72) Inventors: Yuki Tsukioka, Tokyo (JP); Akira Ikada, Tokyo (JP); Michinobu Takahagi, Shiga (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/352,694

(22) Filed: Jun. 21, 2021

(65) Prior Publication Data

US 2021/0394251 A1    Dec. 23, 2021

(30) Foreign Application Priority Data

Jun. 23, 2020  (JP) .................................. 2020-107883

(51) Int. Cl.
   *B21J 15/04*          (2006.01)
(52) U.S. Cl.
   CPC .................................... *B21J 15/04* (2013.01)
(58) Field of Classification Search
   CPC .................................. B21J 15/02; F16B 19/06
   See application file for complete search history.

(56) References Cited

U.S. PATENT DOCUMENTS

| | | | | |
|---|---|---|---|---|
| 3,927,458 A | * | 12/1975 | Speakman | .............. F16B 19/04 29/524.1 |
| 4,051,592 A | * | 10/1977 | Briles | ...................... B21J 15/02 29/524.1 |
| 4,630,463 A | | 12/1986 | Knowlton | |
| 4,688,317 A | * | 8/1987 | Matuschek | ............. F16B 19/06 411/501 |
| 5,035,041 A | * | 7/1991 | Matuschek | .............. B21J 15/36 29/525 |

(Continued)

FOREIGN PATENT DOCUMENTS

| | | | | |
|---|---|---|---|---|
| JP | 2009061464 A | * | 3/2009 | |
| JP | 2012115869 A | * | 6/2012 | ............. B21J 13/02 |

(Continued)

OTHER PUBLICATIONS

Machine translation of JP-2009061464-A (Year: 2009).*
Machine translation of JP-2012115869-A (Year: 2012).*

*Primary Examiner* — Kyle A Cook
(74) *Attorney, Agent, or Firm* — HAUPTMAN HAM, LLP

(57) ABSTRACT

Provided is a riveting device that deforms a rivet inserted into a through-hole formed in a plurality of plate-shaped members disposed in a superimposed state and secures the plurality of plate-shaped members, the riveting device including: an upper anvil that is disposed in a state in which the upper anvil faces an end surface of a head of the rivet; a lower anvil that is disposed in a state in which the lower anvil faces an end surface of a shaft portion 210 of the rivet; and a pressurizing mechanism that generates a pressurizing force of causing a distance between the upper anvil and the lower anvil along an axial line to decrease and plastically deforms the rivet, in which the pressurizing surface of the lower anvil is formed into a flat shape that perpendicularly intersects the axial line, and a surface roughening treatment is performed on the pressurizing surface.

4 Claims, 7 Drawing Sheets

(56) References Cited

U.S. PATENT DOCUMENTS

| | | | | |
|---|---|---|---|---|
| 5,082,411 | A | * | 1/1992 | Auriol ................ B21J 15/02 |
| | | | | 29/524.1 |
| 5,279,024 | A | | 1/1994 | Zieve et al. |
| 5,580,202 | A | * | 12/1996 | Luhm ................ B21J 15/02 |
| | | | | 29/524.1 |
| 5,680,690 | A | * | 10/1997 | Briles ................ B21J 15/02 |
| | | | | 29/524.1 |
| 5,868,356 | A | * | 2/1999 | Giedris .............. F16B 19/06 |
| | | | | 29/524.1 |
| 2002/0172576 | A1 | * | 11/2002 | Keener .............. F16B 19/06 |
| | | | | 411/504 |
| 2005/0220533 | A1 | * | 10/2005 | Prichard ........... B29C 66/1122 |
| | | | | 403/282 |
| 2006/0016056 | A1 | * | 1/2006 | Kato ................ B21J 15/36 |
| | | | | 29/283 |
| 2008/0233838 | A1 | * | 9/2008 | Mase ............... B24C 11/00 |
| | | | | 451/38 |
| 2013/0205574 | A1 | * | 8/2013 | Doo ................. B21J 15/10 |
| | | | | 29/524.1 |
| 2016/0052042 | A1 | * | 2/2016 | Christensen ....... B21J 15/02 |
| | | | | 29/407.04 |
| 2018/0148194 | A1 | * | 5/2018 | Hood ............... B21J 15/142 |
| 2019/0134699 | A1 | * | 5/2019 | Inagaki ............ B21J 15/44 |
| 2019/0368607 | A1 | * | 12/2019 | Smith .............. F16J 9/22 |
| 2020/0406339 | A1 | * | 12/2020 | Jene ............... B21J 15/36 |

FOREIGN PATENT DOCUMENTS

| | | |
|---|---|---|
| JP | 2017205802 A | 11/2017 |
| JP | 2018122354 A | 8/2018 |

* cited by examiner

RIVETING DEVICE AND RIVETING METHOD

RELATED APPLICATIONS

The present application claims priority to Japanese Application Number 2020-107883 filed Jun. 23, 2020, the disclosure of which is hereby incorporated by reference herein in its entirety.

BACKGROUND

1. Technical Field

The present disclosure relates to a riveting device and a riveting method that deform a rivet inserted into a through-hole formed in a plurality of plate-shaped members disposed in a superimposed state and secure the plurality of plate-shaped members.

2. Description of Related Art

In the related art, a device that forms a through-hole in two or more members in an aircraft body panel or the like and deforms a fastener inserted into the through-hole to secure the two or more members is known (see Japanese Unexamined Patent Application, Publication No. 2018-122354, for example). The device disclosed in Japanese Unexamined Patent Application, Publication No. 2018-122354 is adapted to apply a force of causing a pair of dies disposed both at a head portion and at an end portion of a shaft portion of the fastener to approach each other and plastically deform the fastener. Japanese Unexamined Patent Application, Publication No. 2018-122354 discloses that a surface of a die with a cup shape is caused to abut on a tail end of the fastener to plastically deform the tail end.

BRIEF SUMMARY

In a case in which a fastener inserted into through holes is plastically deformed to secure two or more members, it is desirable that a state in which no clearance is formed between the fastener and the through-hole be obtained to enhance fatigue strength of a part fastened with the fastener. As a result of studies of the present inventors, the inventors discovered that a force of plastically deforming the fastener tends to cause the tail end of the shaft portion to be enlarged in the radial direction if surface roughness of the die abutting on the tail end (end surface) of the shaft portion of the fastener (rivet) is less than a predetermined value.

In this case, enlargement in the radial direction of the tail end of the shaft portion that is not accommodated in the through-hole becomes excessively large, and with this, enlargement in the radial direction of the shaft portion that is accommodated in the through-hole becomes excessively small. If the enlargement of the shaft portion in the radial direction becomes excessively small, then a clearance is generated between the shaft portion and the through-hole. In a case in which a clearance is present between the fastener and the through-hole after the head portion of the fastener is plastically deformed, fatigue strength of the part fastened with the fastener is degraded.

The present invention was made in view of the aforementioned problem, and an object thereof is to provide a riveting device and a riveting method that enable excessive plastic deformation of an end surface of a shaft portion of a rivet in a radial direction to be curved and enable degradation of fatigue strength at a part fastened with the rivet due to formation of a clearance between the shaft portion and a through-hole to be prevented.

In order to solve the aforementioned problem, the present disclosure employs the following solutions.

A riveting device according to an aspect of the present disclosure is a riveting device that deforms a rivet inserted into a through-hole formed in a plurality of plate-shaped members disposed in a superimposed state and secures the plurality of plate-shaped members, the rivet including a shaft portion that extends along an axial line and has a first outer diameter in a radial direction that perpendicularly intersects the axial line and a head that is coupled to the shaft portion and has a second outer diameter that is larger than the first outer diameter in the radial direction, the riveting device including: a first riveting member that has a support surface disposed in a state in which the support surface faces a first end surface of the head; a second riveting member that has a pressurizing surface disposed in a state in which the pressurizing surface faces a second end surface of the shaft portion; and a pressurizing mechanism that generates a pressurizing force of causing a distance between the first riveting member and the second riveting member along the axial line to decrease and plastically deforms the rivet, in which the pressurizing surface of the second riveting member is formed into a flat shape that perpendicularly intersects the axial line, and a surface roughening treatment is performed on the pressurizing surface.

A riveting method according to an aspect of the present disclosure is a riveting method of deforming a rivet inserted into a through-hole formed in a plurality of plate-shaped members disposed in a superimposed state and securing the plurality of plate-shaped members, the rivet including a shaft portion that extends along an axial line and has a first outer diameter in a radial direction that perpendicularly intersects the axial line and a head that is coupled to the shaft portion and has a second outer diameter that is larger than the first outer diameter in the radial direction, the riveting method including: a first disposing process of disposing a support surface of a first riveting member in a state in which the support surface faces a first end surface of the head; a second disposing process of disposing a pressurizing surface of a second riveting member in a state in which the pressurizing surface faces a second end surface of the shaft portion; and a riveting process of generating a pressurizing force of causing a distance between the first riveting member and the second riveting member along the axial line to decrease and plastically deforming the rivet, in which the pressurizing surface of the second riveting member is formed into a flat shape that perpendicularly intersects the axial line, and a surface roughening treatment is performed on the pressurizing surface.

According to the present disclosure, it is possible to provide a riveting device and a riveting method that enable excessive plastic deformation of the end surface of the shaft portion of the rivet in the radial direction to be curbed and enable degradation of fatigue strength of a part fastened with the rivet due to formation of a clearance between the shaft portion and the through-hole to be prevented.

DETAILED DESCRIPTION

Hereinafter, a riveting device 100 according to an embodiment of the present disclosure will be described with reference to the drawings.

The riveting device 100 according to the present embodiment is a device that plastically deforms a rivet 200 inserted into a through-hole 330 formed in a plurality of plate-shaped members 310 and 320 disposed in a superimposed state and secures the plurality of plate-shaped members 310 and 320. The plurality of plate-shaped members 310 and 320 are, for example, aircraft body panels. The plurality of plate-shaped members 310 and e20 are formed using an aluminum alloy, for example. Although an example in which two plate-shaped members are disposed in a superimposed manner will be described in the present embodiment, an arbitrary number, such as three or more, of plate-shaped members may be disposed in a superimposed manner.

Figure 1:
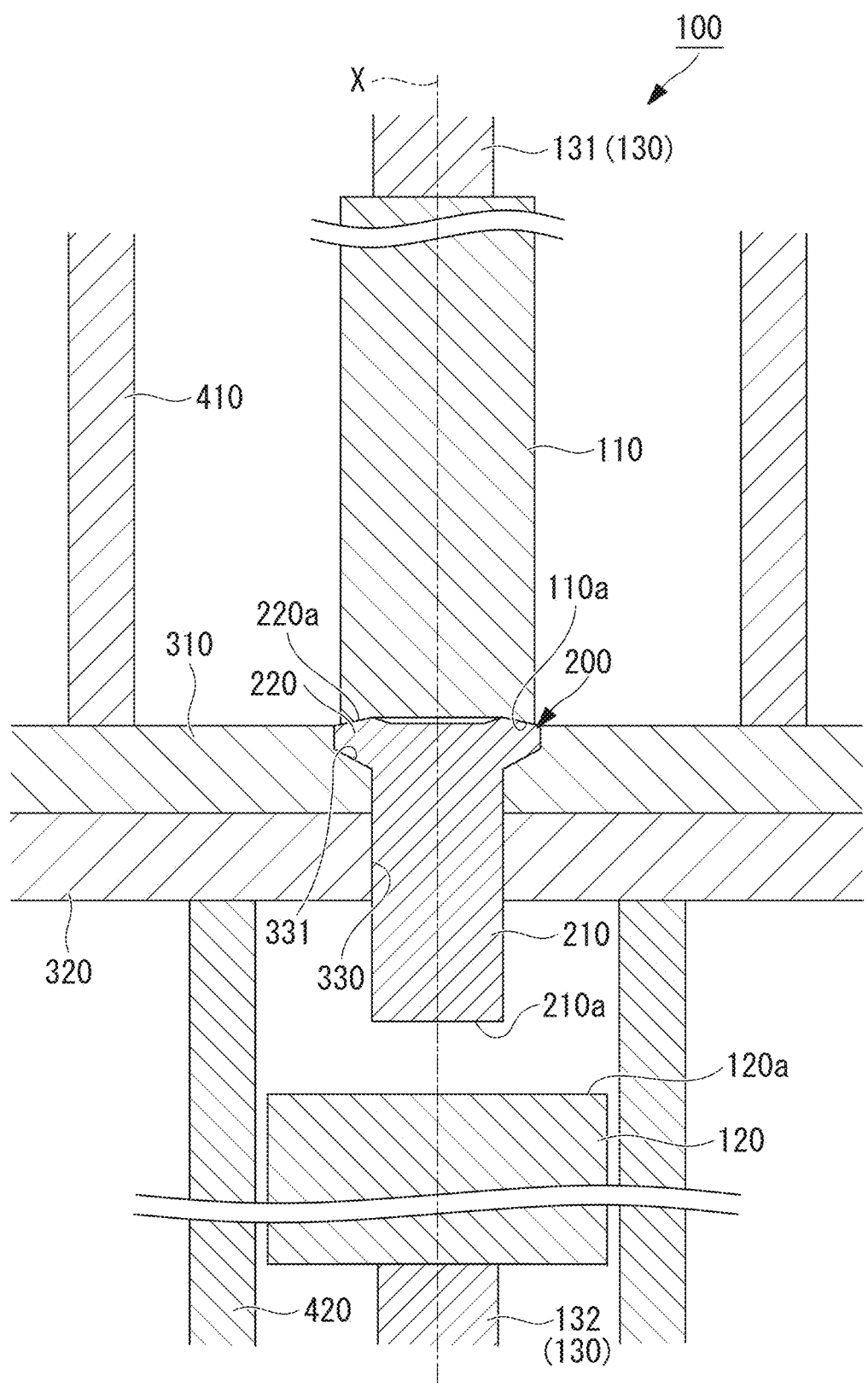
FIG. 1 is a sectional view illustrating a riveting device according to an embodiment of the present disclosure and illustrates a state before a rivet is plastically deformed.
Figure 2:
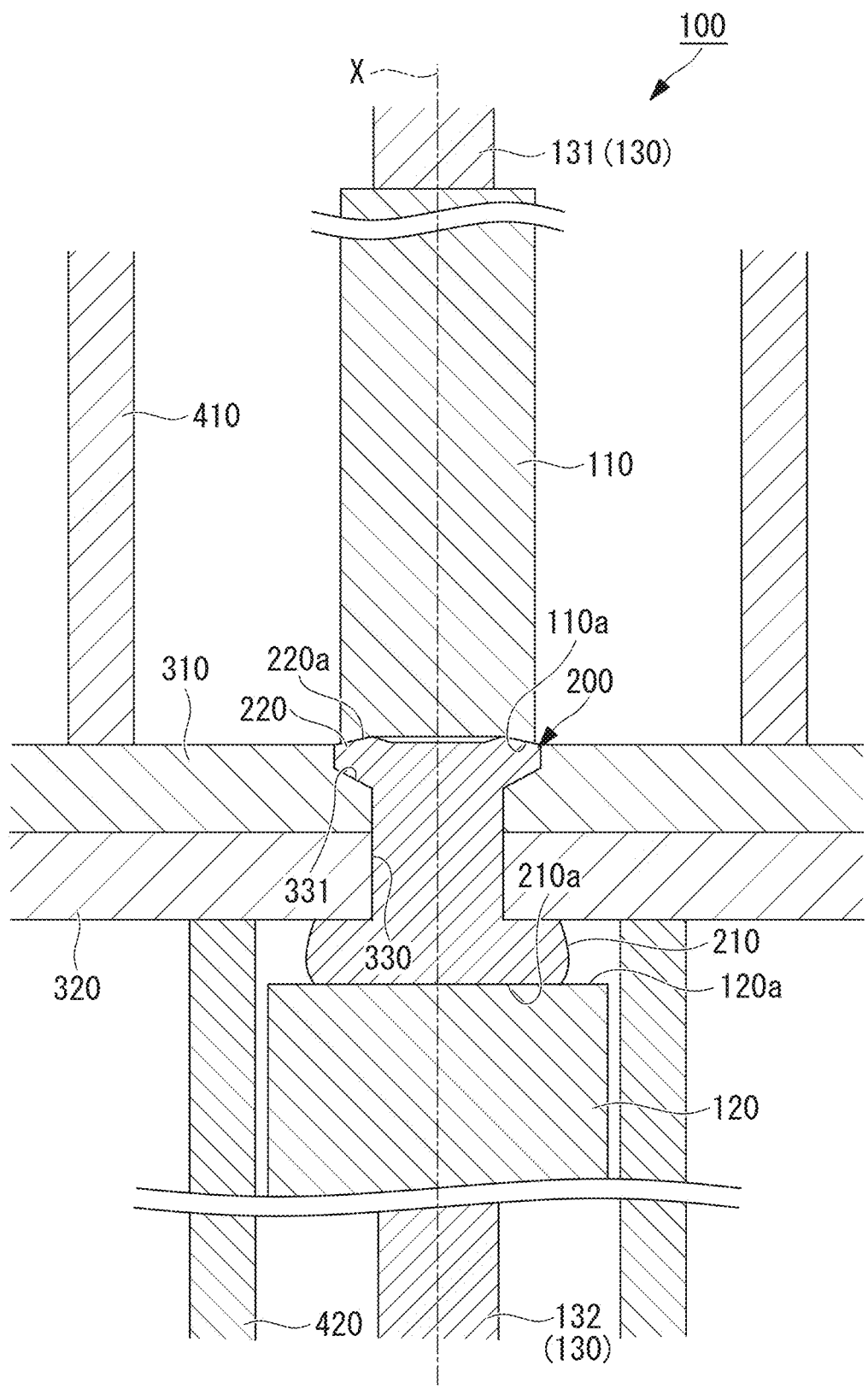
FIG. 2 is a sectional view illustrating the riveting device according to the embodiment of the present disclosure and illustrates a state after the rivet is plastically deformed.

FIG. 1 is a sectional view illustrating the riveting device 100 according to the embodiment of the present disclosure and illustrates a state before a rivet 200 is plastically deformed. FIG. 2 is a sectional view illustrating the riveting device 100 according to the embodiment of the present disclosure and illustrates a state after the rivet 200 is plastically deformed.

As illustrated in FIGS. 1 and 2, the plate-shaped member 310 disposed on the upper side is supported by a cylindrical upper support body 410 extending along an axial line X. The plate-shaped member 320 disposed on the lower side is supported by a cylindrical lower support body 420 extending along the axial line X. The plate-shaped member 310 and the plate-shaped member 320 are disposed in a state in which the plate-shaped member 310 and the plate-shaped member 320 are secured at predetermined positions on the axial line X by being supported by the upper support body 410 and the lower support body 420 in a sandwiched state. Here, the axial line X is a linear line extending in a direction that perpendicularly intersects planes in which the plurality of plate-shaped members 310 and 320 are disposed.

The through-hole 330 extending along the axial line X is formed in the plate-shaped member 310 and the plate-shaped member 320. The through-hole 330 is formed in the plate-shaped member 310 and the plate-shaped member 320 supported in a superimposed state by the upper support body 410 and the lower support body 420 using a punching mechanism (not illustrated) that moves forward and backward along the axial line X. A counterbore portion 331 for accommodating a head 220 of the rivet 200 is formed at an end portion of the through-hole 330 on the upper side.

As illustrated in FIGS. 1 and 2, the riveting device 100 includes an upper anvil (first riveting member) 110, a lower anvil (second riveting member) 120, and a pressurizing mechanism 130. The upper anvil 110 and the lower anvil 120 are formed using an iron-based metal material containing iron such as tool steel, for example, as a main constituent.

The upper anvil 110 is a member formed into a shaft shape extending along the axial line X and includes an end surface 110a that is disposed in a state in which the end surface 110a faces an end surface (first end surface) 220a of the head 220 of the rivet 200 inserted into the through-hole 330. The upper anvil 110 can be moved along the axial line X by the pressurizing mechanism 130 (upper pressurizing mechanism 131) and is disposed in a state in which the upper anvil 110 is in contact with the end surface 220a of the head 220 of the rivet 200 when a riveting operation of plastically deforming the rivet 200 is performed.

The lower anvil 120 is a member formed into a shaft shape extending along the axial line X and includes a pressurizing surface 120a disposed in a state in which the pressurizing surface 120a faces an end surface (second end surface) 210a of a shaft portion 210 of the rivet 200. The lower anvil 120 can be moved along the axial line X by the pressurizing mechanism 130 (lower pressurizing mechanism 132) and is disposed in a state in which the lower anvil 120 is in contact with the end surface 210a of the shaft portion 210 of the rivet 200 when the riveting operation of plastically deforming the rivet 200 is performed.

The pressurizing mechanism 130 is a mechanism that generates a pressurizing force of causing the distance between the upper anvil 110 and the lower anvil 120 along the axial line X to decrease and plastically deforms the rivet 200. The pressurizing mechanism 130 includes an upper pressurizing mechanism 131 that causes the upper anvil 110 to move along the axial line X and a lower pressurizing mechanism 132 that causes the lower anvil 120 to move along the axial line X.

The pressurizing mechanism 130 causes the lower anvil 120 to move from the position separated from the shaft portion 210 as illustrated in FIG. 1 to the position at which the lower anvil 120 comes into contact with the shaft portion 210 as illustrated in FIG. 2 in a state in which the end surface 110a of the upper anvil 110 is in contact with the end surface 220a of the head 220 of the rivet 200. The pressurizing mechanism 130 thus applies a pressurizing force to the rivet 200 and plastically deforms the rivet 200. As illustrated in FIG. 2, the shaft portion 210 of the rivet on the side of the end surface 210a is plastically deformed due to the pressurizing force applied by the pressurizing mechanism 130 and is plastically deformed into a substantially cylindrical shape with a larger outer diameter than the inner diameter of the through-hole 330.

In a riveting method executed by the riveting device 100 according to the present embodiment, the following processes are executed.

First, a support surface 112 of the upper anvil 110 is disposed in a state in which the support surface 112 faces and comes into contact with the end surface 220a of the head 220 of the rivet 200, as illustrated in FIG. 1 (first disposing process).

Second, the pressurizing surface 120a of the lower anvil 120 is disposed in a state in which the pressurizing surface 120a of the lower anvil 120 faces the end surface 210a of the shaft portion 210, as illustrated in FIG. 1 (second disposing process).

Third, the pressurizing mechanism 130 generates a pressurizing force of causing the distance between the upper anvil 110 and the lower anvil 120 along the axial line X to decrease and plastically deforms the rivet 200, as illustrated in FIG. 2 (riveting process).

Through the processes as described above, the riveting device 100 plastically deforms the rivet 200 inserted into the through-hole 330 formed in the plurality of plate-shaped members 310 and 320 disposed in a superimposed state and secures the plurality of plate-shaped members 310 and 320.

Figure 3:
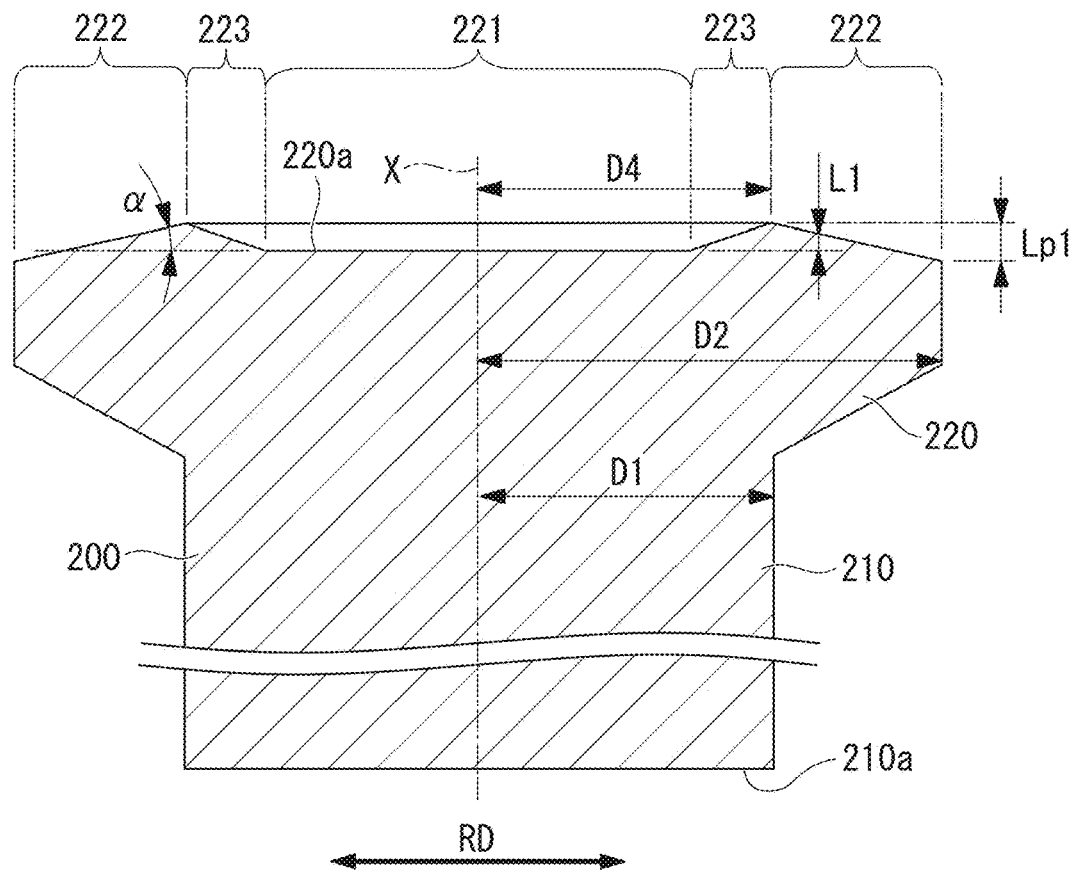
FIG. 3 is a sectional view illustrating the rivet before plastic deformation.
Figure 4:
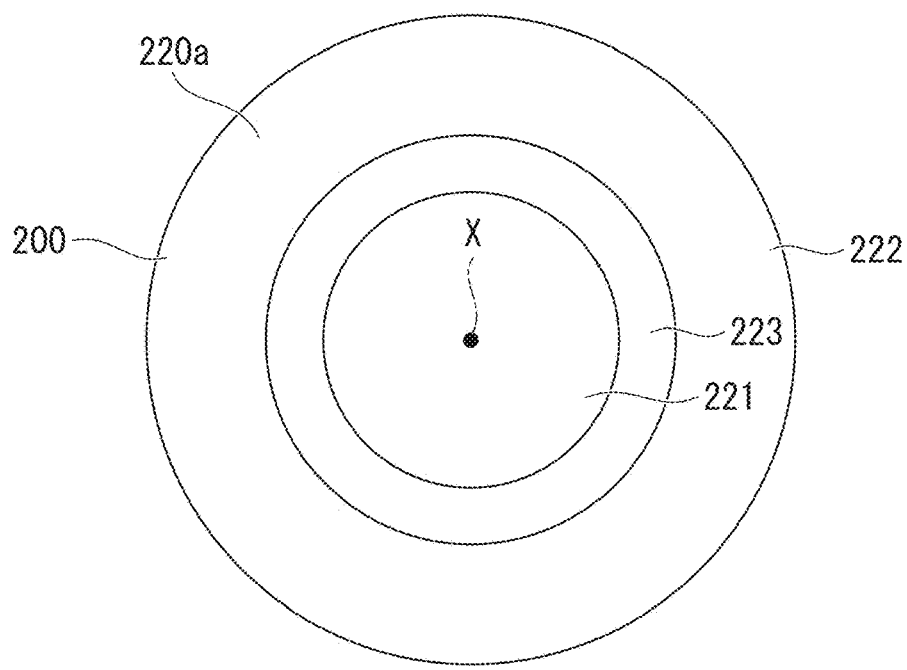
FIG. 4 is a plan view of an end surface of a head of the rivet illustrated in FIG. 3 when seen along an axial line.

Next, the rivet 200 that the riveting device 100 according to the present embodiment plastically deforms will be described with reference to the drawings. FIG. 3 is a sectional view illustrating the rivet 200 before plastic deformation. FIG. 4 is a plan view of the end surface 220a of the head 220 f the rivet 200 illustrated in FIG. 3 when seen along the axial line X.

The rivet 200 is a member that is inserted into the through-hole 330 formed in the plate-shaped member 310 and the plate-shaped member 320 and secures the plate-shaped member 310 and the plate-shaped member 320 through plastic deformation. The rivet 200 is formed using an aluminum alloy, for example.

As illustrated in FIG. 3, the rivet 200 includes the shaft portion 210 and the head 220. The shaft portion 210 extends along the axial line X and has an outer diameter (first outer diameter) D1 in a radial direction RD that perpendicularly intersects the axial line X. The head 220 is coupled to the shaft portion 210 and has an outer diameter (second outer diameter) D2 that is larger than the outer diameter D1 in the radial direction RD. The outer diameter D1 is, for example, 5 to 8 mm.

As illustrated in FIGS. 3 and 4, a flat surface 221, an inclined surface 222, and a coupling surface 223 are formed in the end surface 220a of the head 220. The flat surface 221 is a surface that perpendicularly intersects the axial line X and is formed into a circular and flat shape with the axial line X located at the center. The inclined surface 222 is disposed on the outer circumferential side in the radial direction RD beyond the flat surface 221. The inclined surface 222 is formed into an annual shape around the axial line X and has a projecting length L1 in the direction of the axial line X with respect to the flat surface 221 gradually decreasing with a constant gradient from the inner circumferential side toward the outer circumferential side in the radial direction RD.

The coupling surface 223 is a surface that is formed into an annular shape around the axial line X and couples the flat surface 221 and the inclined surface 222. The coupling surface 223 is disposed on the outer circumferential side in the radial direction RD beyond the flat surface 221 and is disposed on the inner circumferential side in the radial direction RD beyond the inclined surface 222. The coupling surface 223 has a projecting length in the direction of the axial line X with respect to the flat surface 221 gradually increasing with a constant gradient from the inner circumferential side toward the outer circumferential side in the radial direction RD. As illustrated in FIG. 3, the inclination angle of the inclined surface 222 with respect to a plane that perpendicularly intersects the axial line X is $\alpha$, which is constant at each position in the circumferential direction around the axial line X.

Figure 5:
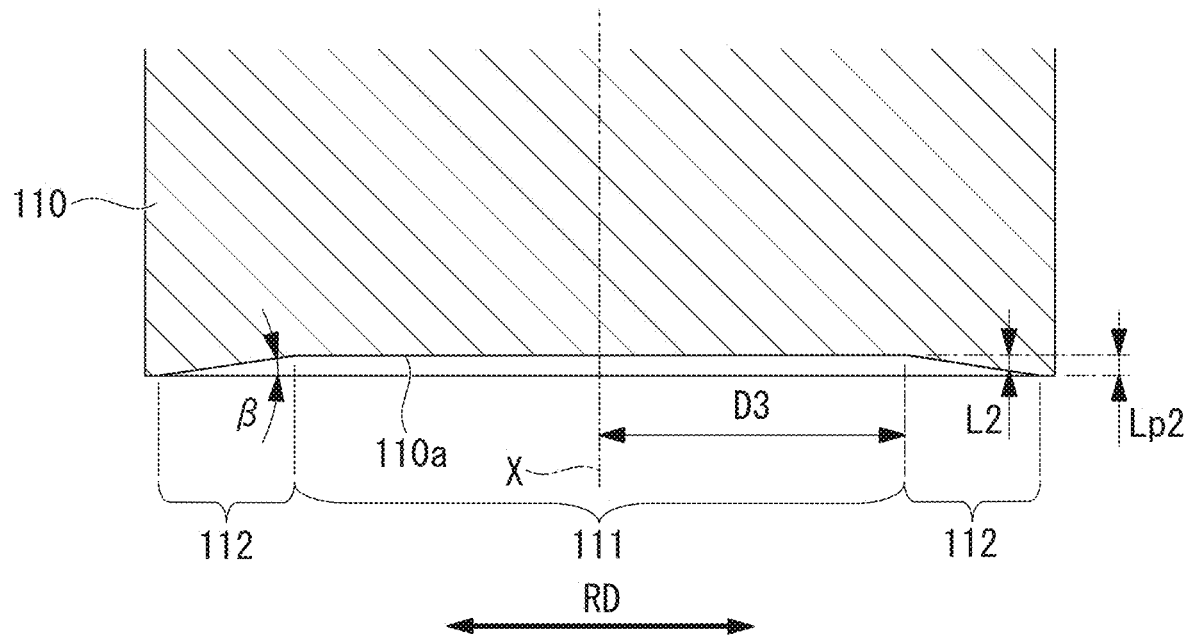
FIG. 5 is a partially enlarged view illustrating a section of an upper anvil.
Figure 6:
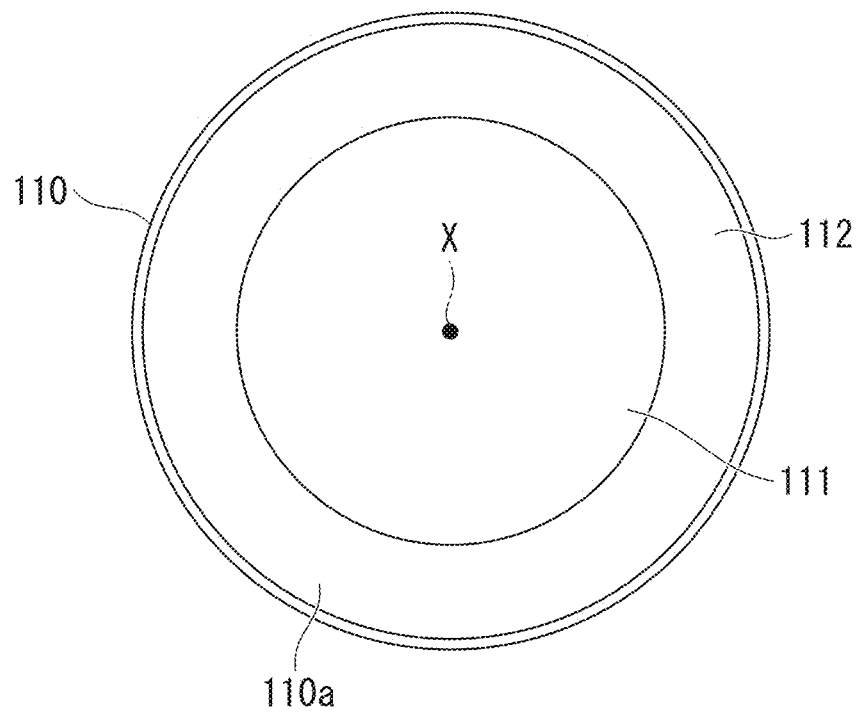
FIG. 6 is a plan view of an end surface of the upper anvil when seen along the axial line.

Next, the shape of the upper anvil 110 that the riveting device 100 according to the present embodiment has will be described with reference to the drawings. The shape of the upper anvil 110 satisfies Expressions (1) to (3) described below to prevent excessive plastic deformation of the head 220 of the rivet 200. FIG. 5 is a partially enlarged view illustrating a section of the upper anvil 110. FIG. 6 is a plan view of the end surface 110a of the upper anvil 110 when seen along the axial line X.

As illustrated in FIGS. 5 and 6, a bottom surface 111 and the support surface 112 are formed in the end surface 110a of the upper anvil 110. The bottom surface 111 perpendicularly intersects the axial line X and is formed into a circular and flat shape with the axial line X located at the center. The support surface 112 is a surface that supports the inclined surface 222 of the rivet 200 when the riveting operation is executed and is disposed on the outer circumferential side in the radial direction RD beyond the bottom surface 111. The support surface 112 is formed into an annular shape around the axial line X and has a projecting length L2 in the direction of the axial line X with respect to the bottom surface 111 gradually increasing with a constant gradient from the inner circumferential side toward the outer circumferential side in the radial direction RD.

As illustrated in FIG. 5, the inclination angle of the support surface 112 with respect to the plane that perpendicularly intersects the axial line X is $\beta$, which is constant at each position in the circumferential direction around the axial line X. The inclination angle $\beta$ of the support surface 112 with respect to the plane that perpendicularly intersects the axial line X is smaller than the inclination angle $\alpha$ of the inclined surface 222 with respect to the plane that perpendicularly intersects the axial line X by a predetermined angle A. In other words, the inclination angle $\alpha$ and the inclination angle $\beta$ are set to satisfy Expression (1) below.

$$\beta = \alpha - A \qquad (1)$$

Here, the predetermined angle A is set to be equal to or greater than 0.5 degrees and equal to or less than 5.0 degrees. Also, the predetermined angle A is preferably set to be equal to or greater than 2.0 degrees and equal to or less than 2.5 degrees.

As illustrated in FIG. 5, the distance in the direction of the axial line X from the end portion of the support surface 112 of the upper anvil 110 on the inner circumferential side in the radial direction RD to the end portion of the support surface 112 on the outer circumferential side in the radial direction RD is Lp2. On the other hand, as illustrated in FIG. 3, the distance in the direction of the axial line X from the end portion of the inclined surface 222 of the rivet 200 on the inner circumferential side in the radial direction RD to the end portion of the inclined surface 222 on the outer circumferential side in the radial direction RD is Lp1. Here, the distance Lp2 and the distance Lp1 are set to satisfy Expression (2) below.

$$Lp2 = Lp1 \cdot B \qquad (2)$$

Here, the coefficient B is set to be equal to or greater than 0.1 and equal to or less than 1.0. More preferably, the coefficient B is set to be equal to or greater than 0.2 and equal to or less than 0.25. In other words, the distance Lp2 is set to be equal to or greater than 0.1 times and equal to or less than 1.0 times the distance Lp1. More preferably, the distance Lp2 is set to be equal to or greater than 0.2 times and equal to or less than 0.25 times the distance Lp1.

As illustrated in FIG. 5, the distance of the end portion of the support surface 112 on the inner circumferential side from the axial line X in the radial direction is D3. On the other hand, as illustrated in FIG. 3, the distance of the end surface of the inclined surface 222 on the inner circumferential side from the axial line X in the radial direction RD is D4. Here, the distance D3 and the distance D4 are set to satisfy Expression (3) below. In other words, the distance D3 and the distance D4 are set to conform to each other.

$$D4=D3 \qquad (3)$$

Note that although the shape of the end surface 110a of the upper anvil 110 is assumed to satisfy all Expressions (1) to (3) in the above description, another aspect may be employed. For example, the shape of the end surface 110a of the upper anvil 110 may be a shape that satisfies Expression (1) and Expression (2) and does not satisfy Expression (3).

Figure 7:
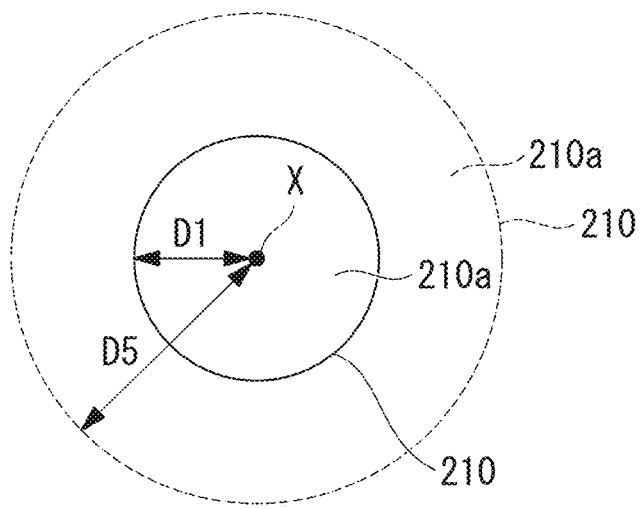
FIG. 7 is a plan view of an end surface of a shaft portion of the rivet when seen along the axial line.

FIG. 7 is a plan view of the end surface 210a of the shaft portion 210 of the rivet 200 when seen along the axial line X. In FIG. 7, a continuous line illustrates the rivet 200 before plastic deformation; a broken line illustrates the rivet 200 after plastic deformation. An outer diameter of the end surface 210a of the shaft portion 210 of the rivet 200 before plastic deformation is D1. On the other hand, the outer diameter of the end surface 210a of the shaft portion 210 of the rivet 200 after plastic deformation is D5 which is larger than D1. D5 is equal to a distance from the axial line X to a portion of the shaft portion 210, the portion having a largest outer diameter among a region of the shaft portion 210 enlarged along the radial direction RD.

Figure 8:
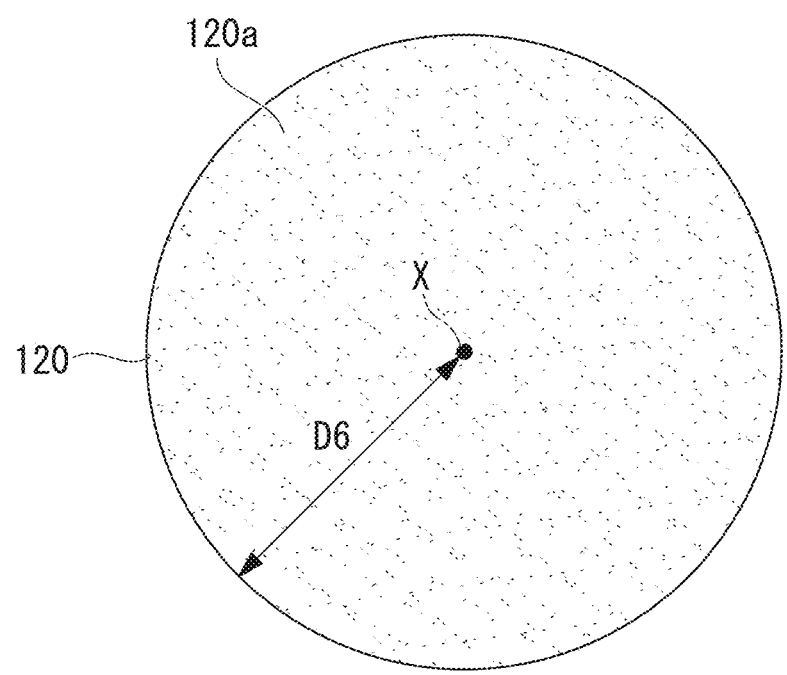
FIG. 8 is a plan view of a pressurizing surface of a lower anvil when seen along the axial line.

FIG. 8 is a plan view of the pressurizing surface 120a of the lower anvil 120 when seen along the axial line X. The pressurizing surface 120a is formed into a flat shape along a plane that perpendicularly intersects the axial line X. The pressurizing surface 120a is formed into a circular shape with an outer diameter D6 with the axial line X located at the center. The outer diameter D6 is larger than the outer diameter D5.

A surface roughening treatment is performed on the pressurizing surface 120a to prevent the end surface 210a of the shaft portion 210 from being excessively enlarged along the radial direction RD when a riveting operation is performed. As the surface roughening treatment, a sanding treatment or a blasting treatment is used, for example. The sanding treatment is a treatment of forming an uneven shape on a surface of a polishing object using a base material such as a disk or a belt for holding abrasive grains. The blasting treatment is a treatment of forming an uneven shape on a surface of a spraying object through spraying abrasive grains.

In the present embodiment, the surface roughening treatment is performed on the pressurizing surface 120a such that arithmetic average roughness Ra of equal to or greater than 32 μin and equal to or less than 500 μin is achieved.

Figure 9:
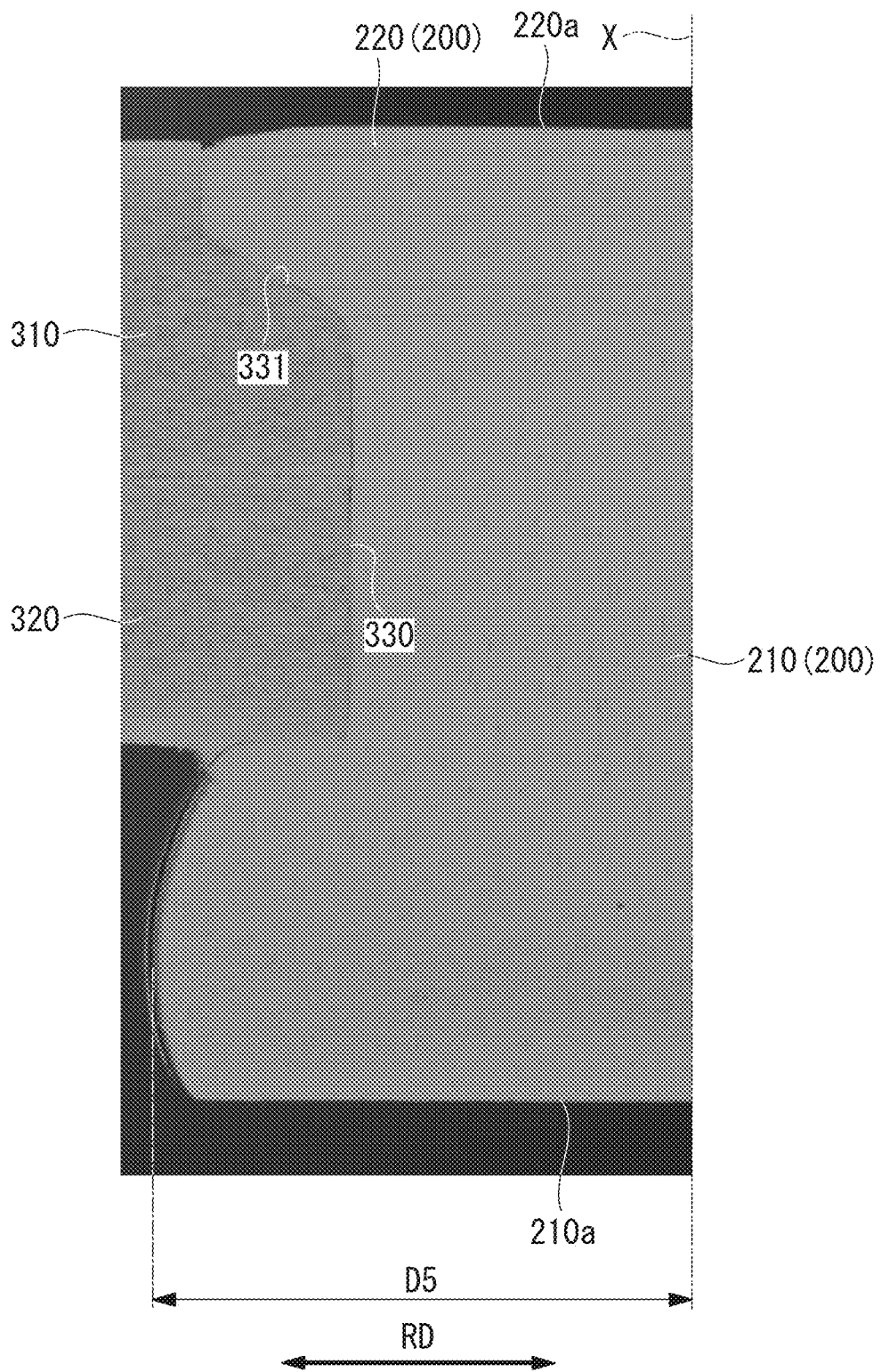
FIG. 9 is a diagram illustrating sections of the rivet and plate-shaped members in a case in which the rivet is plastically deformed by the riveting device according to the present embodiment.
Figure 10:
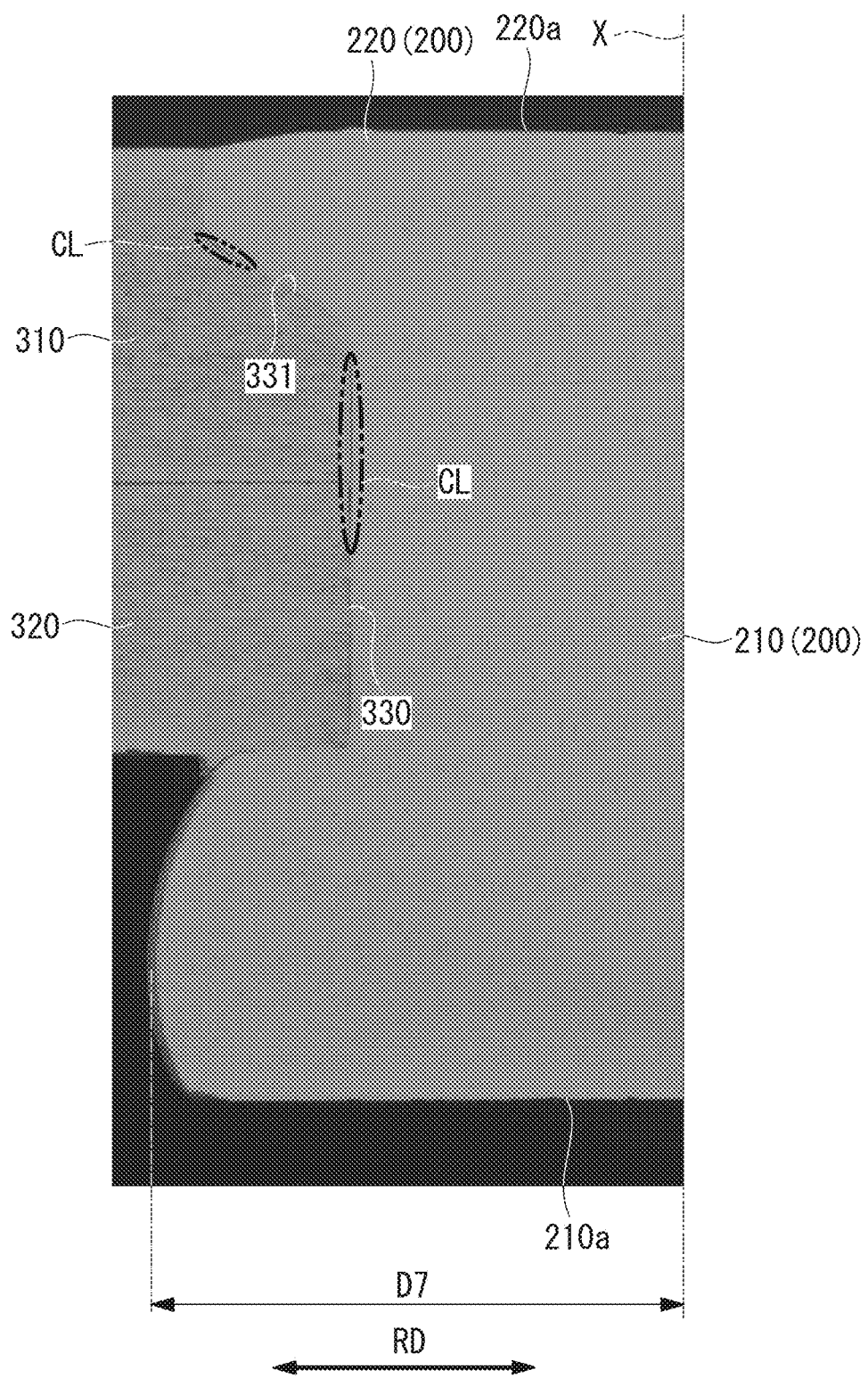
FIG. 10 is a diagram illustrating sections of the rivet and the plate-shaped members in a case in which the rivet is plastically deformed by a riveting device according to a comparative example.

Next, experiment results in a case in which the rivet 200 is plastically deformed by the riveting device 100 according to the present embodiment and in a case in which the rivet 200 is plastically deformed by a riveting device (not illustrated) according to a comparative example will be compared. FIG. 9 is a diagram illustrating sections of the rivet 200 and the plate-shaped members 310 and 320 in a case in which the rivet 200 is plastically deformed by the riveting device 100 according to the present embodiment. FIG. 10 is a diagram illustrating sections of the rivet 200 and the plate-shaped members 310 and 320 in a case in which the rivet 200 is plastically deformed by the riveting device according to the comparative example. The thickness of the plate-shaped members 310 and 320 illustrated in FIG. 9 (the length in the direction of the axial line X) and the thickness of the plate-shaped members 310 and 320 illustrated in FIG. 10 are the same.

The riveting device 100 according to the present embodiment and the riveting device according to the comparative example have different surface roughness of the pressurizing surface 120a of the lower anvil 120. A surface roughening treatment is not performed on the pressurizing surface 120a of the lower anvil 120 in the riveting device according to the comparative example, and arithmetic average roughness Ra is equal to or less than 16 μin.

As illustrated in FIG. 9, as for the rivet 200 plastically deformed by the riveting device 100 according to the present embodiment, no clearance is formed between the shaft portion 210 and the through-hole 330, and no clearance is formed between the head 220 and the counterbore portion 331. Here, the clearance means an interval of equal to or greater than 0.01 mm, for example.

On the other hand, as for the rivet 200 plastically deformed by the riveting device according to the comparative example, a clearance CL is formed between the shaft portion 210 and the through-hole 330 and between the head 220 and the counterbore portion 331 as illustrated in FIG. 10. The reason that the clearance CL is formed in FIG. 10 is considered to be because the surface roughening treatment is not performed on the pressurizing surface 120a of the lower anvil 120 according to the comparative example and the end surface 210a of the shaft portion 210 of the rivet 200 is excessively plastically deformed in the radial direction RD. The rivet 200 plastically deformed by the riveting device according to the comparative example is enlarged up to an outer diameter D7 that is larger than the outer diameter D5 at an end portion that is not inserted into the through-hole 330.

It is considered that in the riveting device according to the comparative example, a pressurizing force used to enlarge the end surface 210a of the shaft portion 210 in the radial direction RD in the pressurizing force transmitted to the end surface 210a of the shaft portion 210 of the rivet 200 is more than that in the riveting device according to the present embodiment. Also, it is considered that in the riveting device according to the comparative example, a pressurizing force used to enlarge the shaft portion 210 and the head 220, which are inserted into the through-hole 330, in the radial direction RD in the pressurizing force transmitted to the end surface 210a of the shaft portion 210 of the rivet 200 is less than that in the riveting device according to the present embodiment.

The riveting device (100) described in each embodiment described above is understood as follows, for example.

A riveting device according to an aspect of the present disclosure is the riveting device (100) that deforms the rivet (200) inserted into the through-hole (330) formed in the plurality of plate-shaped members (310, 320) disposed in a superimposed state and secures the plurality of plate-shaped members, the rivet including the shaft portion (210) that extends along the axial line (X) and has the first outer diameter (D1) in the radial direction (RD) that perpendicularly intersects the axial line and the head (220) that is coupled to the shaft portion and has the second outer diameter (D2) that is larger than the first outer diameter in the radial direction, the riveting device including: the first riveting member (110) that has the support surface (110a) disposed in a state in which the support surface (110a) faces the first end surface (220a) of the head; the second riveting member (120) that has the pressurizing surface (120a) disposed in a state in which the pressurizing surface (120a)

faces the second surface (210a) of the shaft portion; and the pressurizing mechanism (130, 140) that generates a pressurizing force of causing the distance between the first riveting member and the second riveting member along the axial line to decrease and plastically deforms the rivet, in which the pressurizing surface of the second riveting member is formed into a flat shape that perpendicularly intersects the axial line, and a surface roughening treatment is performed on the pressurizing surface.

According to the riveting device of the present disclosure, it is possible to secure the plurality of plate-shaped members with the rivet by causing the support surface of the first riveting member to come into contact with the first end surface of the head of the rivet inserted into the through-hole formed in the plurality of plate-shaped members, causing the second riveting member to come into contact with the second end surface of the shaft portion of the rivet, and plastically deforming the rivet with the pressurizing force generated by the pressurizing mechanism.

The pressurizing surface of the second riveting member disposed to face the second end surface of the shaft portion of the rivet is formed into a flat shape that perpendicularly intersects the axial line, and a surface roughening treatment is performed thereon. Since the surface roughening treatment is performed thereon, movement of the second end surface that comes into contact with the pressurizing surface in the radial direction relative to the pressurizing surface is curbed. In this manner, excessive plastic deformation of the second end surface of the shaft portion that has come into contact with the pressurizing surface due to enlargement thereof in the radial direction is curbed, and degradation of fatigue strength at a part fastened with the rivet due to formation of a clearance between the shaft portion and the through-hole is prevented.

In the riveting device according to an aspect of the present disclosure, the surface roughening treatment is preferably performed on the pressurizing surface such that arithmetic average roughness Ra of equal to or greater than 32 µin and equal to or less than 500 µin is achieved.

It is possible to curb excessive plastic deformation of the second end surface of the shaft portion of the rivet in the radial direction by setting the arithmetic average roughness Ra of the pressurizing surface to be equal to or greater than 32 µin. Also, it is possible to curb an excessive increase in surface roughness of the second end surface of the rivet after plastic deformation by setting the arithmetic average roughness Ra of the pressurizing surface to be equal to or less than 500 µin.

In the riveting device according to an aspect of the present disclosure, the surface roughening treatment is preferably a sanding treatment or a blasting treatment.

It is possible to appropriately roughen the pressurizing surface of the second riveting member by performing the sanding treatment or the blasting treatment thereon.

In the riveting device according to an aspect of the present disclosure, the rivet is preferably formed using an aluminum alloy, and the second riveting member is preferably formed using a metal material containing iron as a main constituent.

In this manner, it is possible to appropriately plastically deform the shaft portion of the rivet formed using the aluminum alloy by the pressurizing surface, on which the surface roughening treatment has been performed, of the second riveting member formed using the metal material.

The riveting method described in each embodiment described above is understood as follows, for example.

A riveting method according to an aspect of the present disclosure is the riveting method that deforms the rivet inserted into the through-hole formed in the plurality of plate-shaped members disposed in a superimposed state and secures the plurality of plate-shaped members, the rivet including the shaft portion that extends along the axial line and has the first outer diameter in the radial direction that perpendicularly intersects the axial line and the head that is coupled to the shaft portion and has the second outer diameter that is larger than the first outer diameter in the radial direction, the riveting method including: the first disposing process of disposing the support surface of the first riveting member in a state in which the support surface faces the first end surface of the head; the second disposing process of disposing the pressurizing surface of the second riveting member in a state in which the pressurizing surface faces the second end surface of the shaft portion; and the riveting process of generating a pressurizing force of causing the distance between the first riveting member and the second riveting member along the axial line to decrease and plastically deforms the rivet, in which the pressurizing surface of the second riveting member is formed into a flat shape that perpendicularly intersects the axial line, and the surface roughening treatment is performed on the pressurizing surface.

According to the riveting method of the present disclosure, it is possible to secure the plurality of plate-shaped members with the rivet by causing the support surface of the first riveting member to come into contact with the first end surface of the head of the rivet inserted into the through-hole formed in the plurality of plate-shaped members, causing the second riveting member to come into contact with the second end surface of the shaft portion of the rivet, and plastically deforming the rivet with the pressurizing force generated in the riveting process.

The pressurizing surface of the second riveting member disposed to face the second end surface of the shaft portion of the rivet is formed into a flat shape that perpendicularly intersects the axial line, and the surface roughening treatment is performed thereon. Since the surface roughening treatment is performed thereon, movement of the second end surface that comes into contact with the pressurizing surface in the radial direction relative to the pressurizing surface is curbed. In this manner, excessive plastic deformation of the second end surface of the shaft portion that has come into contact with the pressurizing surface due to enlargement thereof in the radial direction, and degradation of fatigue strength at a part fastened with the rivet due to formation of a clearance between the shaft portion and the through-hole is prevented.

The riveting method in an aspect of the present disclosure, the surface roughening treatment is preferably performed on the pressurizing surface such that arithmetic average roughness Ra of equal to or greater than 32 µin and equal to or less than 500 µin is achieved.

It is possible to curb excessive plastic deformation of the second end surface of the shaft portion of the rivet in the radial direction by setting the arithmetic average roughness Ra of the pressurizing surface to be equal to or greater than 32 µin. Also, it is possible to curb an excessive increase in surface roughness of the second end surface of the rivet after plastic deformation by setting the arithmetic average roughness Ra of the pressurizing surface to be equal to or less than 500 µin.

In the riveting method according to an aspect of the present disclosure, the surface roughening treatment is preferably a sanding treatment or a blasting treatment.

It is possible to appropriately rough the pressurizing surface of the second riveting member by performing the sanding treatment or the blasting treatment thereon.

In the riveting method according to an aspect of the present disclosure, the rivet is preferably formed using an aluminum alloy, and the second riveting member is preferably formed using a metal material containing iron as a main constituent.

In this manner, it is possible to appropriately plastically deform the shaft portion of the rivet formed using the aluminum alloy by the pressurizing surface, on which the surface roughening treatment has been performed, of the second riveting member formed using the metal material.

What is claimed is:

1. A riveting method of deforming a rivet inserted into a through-hole formed in a plurality of plate-shaped members disposed in a superimposed state and securing the plurality of plate-shaped members, the rivet including
- a shaft portion that extends along an axial line and has a first outer diameter in a radial direction that perpendicularly intersects the axial line, and
- a head that is coupled to the shaft portion and has a second outer diameter that is larger than the first outer diameter in the radial direction, the head comprising an incline surface, a coupling surface, and a flat surface, the coupling surface connecting the incline surface to the flat surface, the riveting method comprising:
- a first disposing process of disposing a support surface of a first riveting member in a state in which the support surface faces a first end surface of the head;
- a second disposing process of disposing a pressurizing surface of a second riveting member in a state in which the pressurizing surface faces a second end surface of the shaft portion; and
- a riveting process of generating a pressurizing force causing a distance between the first riveting member and the second riveting member along the axial line to decrease and plastically deforming the rivet, wherein a counterbore portion for accommodating the head of the rivet is formed at an end portion of the through-hole, wherein the pressurizing surface of the second riveting member is formed into a flat shape that perpendicularly intersects the axial line, and a surface roughening treatment is performed on the pressurizing surface, wherein the riveting process causes the pressurizing surface on which the surface roughening treatment is performed to come into contact with the second end surface of the shaft portion of the rivet and plastically deform the rivet with the pressurizing force, and wherein the pressurizing surface on which the surface roughening treatment is performed curbs movement of the second end surface of the shaft portion that comes into contact with the pressurizing surface relative to the pressurizing surface in comparison with the pressurizing surface on which the surface roughening treatment is not performed so that a clearance formed between the head of the rivet and the counterbore portion is reduced more when the rivet is plastically deformed by the pressurizing surface on which the roughening treatment is performed than by the pressurizing surface on which the surface roughening treatment is not performed.

2. The riveting method according to claim 1,
wherein the rivet is formed using an aluminum alloy, and the second riveting member is formed using a metal material containing iron as a main constituent.

3. The riveting method according to claim 1, wherein the surface roughening treatment is performed on the pressurizing surface such that arithmetic average roughness Ra of equal to or greater than 32 μin and equal to or less than 500 μin is achieved.

4. The riveting method according to claim 3, wherein the surface roughening treatment is a sanding treatment or a blasting treatment.

\* \* \* \* \*